United States Patent [19]

Lipschütz

[11] Patent Number: 4,562,710
[45] Date of Patent: Jan. 7, 1986

[54] SECURITY DEVICE FOR HYDRAULICALLY BLOCKING THE STEERING OF MOTOR VEHICLES

[75] Inventor: Paul Lipschütz, Croissy, France

[73] Assignee: Neiman S.A., Courbevoie, France

[21] Appl. No.: 545,389

[22] PCT Filed: Jan. 25, 1983

[86] PCT No.: PCT/EP83/00017
§ 371 Date: Sep. 28, 1983
§ 102(e) Date: Sep. 28, 1983

[87] PCT Pub. No.: WO83/02592
PCT Pub. Date: Aug. 4, 1983

[30] Foreign Application Priority Data
Jan. 28, 1982 [FR] France .................................. 82 01310

[51] Int. Cl.$^4$ ............................................. B60R 25/02
[52] U.S. Cl. ............................................. 70/252; 70/264
[58] Field of Search .................... 70/262–264, 70/252; 180/132, 148, 272, 287

[56] References Cited

U.S. PATENT DOCUMENTS

| | | | |
|---|---|---|---|
| 2,695,685 | 11/1954 | Jamison | 180/287 X |
| 2,802,674 | 8/1957 | Jackson | 180/148 X |
| 3,515,442 | 6/1970 | Whittemore | 180/287 X |
| 3,550,717 | 12/1970 | Doty, Jr. | 180/287 X |
| 4,119,171 | 10/1978 | Remontet | 70/252 X |
| 4,146,244 | 3/1979 | Presley | 180/148 X |
| 4,175,635 | 11/1979 | Thomas | 180/287 |
| 4,273,027 | 6/1981 | Reinhard et al. | 70/264 X |
| 4,418,779 | 12/1983 | Nakayama et al. | 180/148 X |

OTHER PUBLICATIONS

"Power Steering System Varies Assistance with Speed", Nishikawa et al., *Automotive Engineering*, Jul. 1979, pp. 70–72.

*Primary Examiner*—Robert L. Wolfe
*Attorney, Agent, or Firm*—Karl F. Ross; Herbert Dubno

[57] ABSTRACT

A wheel lock for the steering system of an automotive vehicle can make use of the power-assist hydraulic cylinder whose piston is connected to the steering linkage. The device includes a slide valve connected between the distributor of the power-assist system and the power cylinder and has a slide plug which can be displaced between positions allowing normal power-assist functions and blocking flow to and from the power cylinder to lock the steering. A key-operated switch can energize an electric motor whose threaded spindle drives a nut connected to the plug to shift the latter when the ignition is turned off, into the wheel-locking position.

11 Claims, 4 Drawing Figures

SECURITY DEVICE FOR HYDRAULICALLY BLOCKING THE STEERING OF MOTOR VEHICLES

CROSS REFERENCE TO RELATED APPLICATIONS

This application is a National Phase Application of PCT/EP83/00017 filed Jan. 25, 1983 and based, in turn, upon a French National application No. 82 01310 filed Jan. 28, 1982 under the International Convention.

FIELD OF THE INVENTION

The invention relates to a security device for motor vechicles which blocks the steering.

BACKGROUND OF THE INVENTION

A steering wheel lock which blocks the steering is a common and efficient device to prevent unauthorized use of a motor vehicle. The known steering wheel locks are mechanical devices attached to the steering column and secure the steering wheel.

These known devices have a number of disadvantages in spite of their effectiveness. They are not self-positioning and a turning of the wheel is necessary to lock the steering. The release of the steering lock generally requires considerable effort. The steering lock is easily accessible when the vechicle is open. The position of the steering wheel lock on the steering column is not favorable as concerns comfort, safety, appearance and even legal regulations.

OBJECT OF THE INVENTION

The object of the invention is to eliminate these disadvantages of known steering wheel locks.

SUMMARY OF THE INVENTION

In accordance with the invention this object is attained with a security device for locking a steering mechanism of a vehicle which includes a device for closing the inlet opening of a hydraulic cylinder whose piston rod is connected to a component of the steering mechanism.

In the case of motor vehicles provided with hydraulically assisted steering the cylinder thereof is the mentioned hydraulic cylinder which is blocked.

The invention is further clarified with the aid of the drawing, which:

SPECIFIC DESCRIPTION

Figure 1:
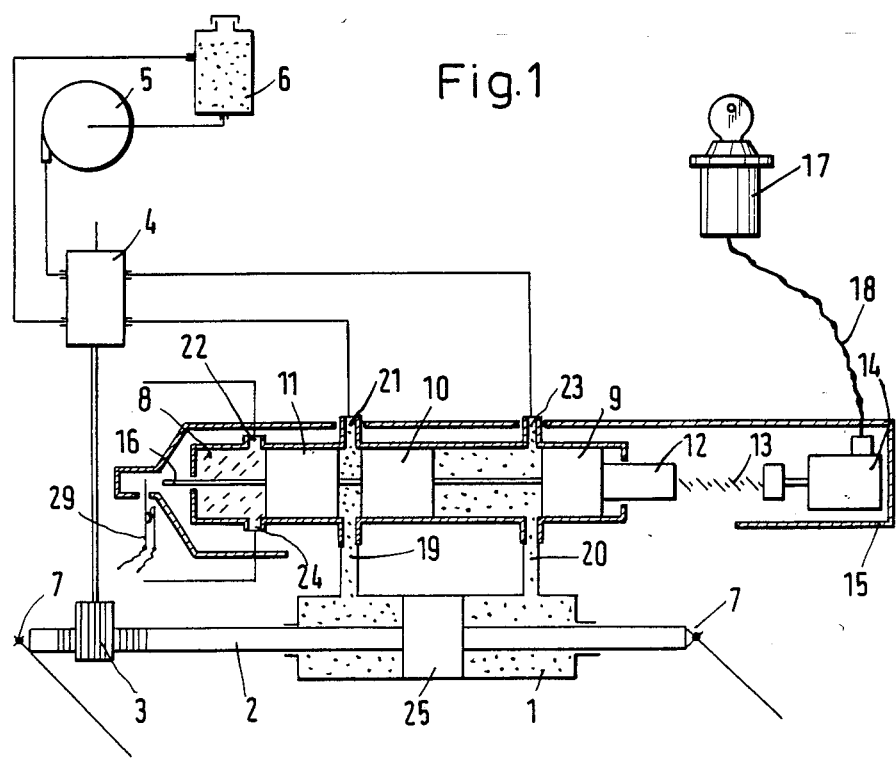
FIG. 1 is a schematic representation of an embodiment of the security device installed in a vehicle with hydraulically assisted steering and showing the hydraulic means in diagrammatic section.

The hydraulic assistance of the steering of the vehicle is effected by means of a hydraulic cylinder 1 whose piston rod 2 has a rack which cooperates with the pinion 3. The pinion 3 controls a distributor 4 connected with a pump 5 and a container 6. The ends of the piston rod 2 cooperate with the links 7 of the steering mechanism. The piston 25 of the hydraulic cylinder 1 divides said cylinder into two compartments, which are connected with two outlets of the distributor 4 via the left inlet opening 19 and the right inlet opening 20.

According to the invention the two openings 19 and 20 can be closed whereby the piston 25 and the piston rod 2 are stopped thereby blocking the links 7. If the vehicle is not provided with hydraulic steering assistance a simple hydraulic device can be provided which consists of a hydraulic cylinder 1 having a piston rod 2 directly connected to the steering.

In the described embodiment, the inlet openings 19, 20 are hydraulically closed. For this purpose the device has a sliding plug 8 with three pistons 9, 10, 11 mounted on a common piston rod 16 and connected with a nut 12. In the operational position shown in the drawing the pistons 9 and 10 do not close any of the openings 19 and 20 and the hydraulic cylinder 1 is normally supplied through openings 21 and 23. For safety reasons, the piston 11 is meant either to interrupt the fuel supply to the engine or to open or close the ignition current circuit in such a manner as to prevent the steering from being blocked while the engine still runs.

The nut 12 cooperates with a spindle 13 driven by an electromotor 14; The ensemble is mounted in a housing 15. The end of the piston rod 16 holds the housing 15 in rest position. The motor 14 is turned on and off by an electric key switch 17 to which it is connected via an armored cable 18. when the switch 17 is turned in the OFF-position and the key is pulled out the motor 14 is turned on and produces a linear motion of the pistons 9, 10, 11 to the left (in the drawing) whereby the supply of the hydraulic cylinder 1 the fuel supply in the conduits 22, 24 and the ignition current circuit 29 are interrupted. The vehicle can no longer be operated and its steering is blocked in its last position. When the key is reintroduced and the lock is turned in the ON-position the motor 14 is again connected and turns now in the opposite direction and moves the pistons 9, 10 11 in the position shown in FIG. 1.

Assuming that for a left-hand turn of the vehicle the steering link 7 will swing to the left in FIG. 1 and for a right-hand turn this linkage will swing to the right, when the steering wheel is rotated to the left or to the right, the piston 2 is shifted in the corresponding direction in accordance with the usual principles of power-assist steering.

If the ports 19 and 20 are then unblocked because the key switch 17 has been operated by its key, hydraulic fluid will then flow from the pump 5 and the reservoir 6 supplying the pump through the distributor 4 to either the right-hand or the left-hand side of the piston 25 in cylinder 1 through either the port 20 or the port 19, depending upon whether the piston 25 is to be shifted to the left or to the right, respectively, to assist hydraulically the displacement in that direction by the steering wheel. When, however, the pistons 9 and 10 block the ports 19 and 20, not only is the inflow precluded to one of the ends of the cylinder 1, but the outflow from the other end in its return through the distributor 4 to the reservoir 6 is precluded as well.

Figure 2:
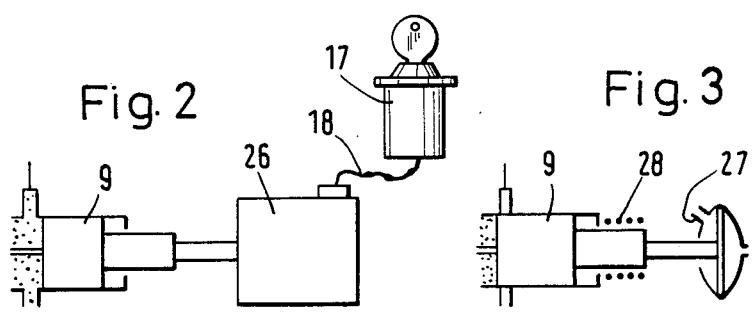
FIGS. 2–4 are diagrammatic elevational and sectional views of a variety of actuating devices for the security device shown in FIG. 1.

The embodiment according to FIG. 2 has the pistons 9, 10, 11 shifted by an electromagnet 26 which in turn is actuated by the switch 17.

Figure 3:
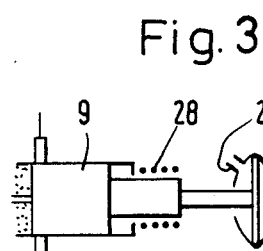

In the embodiment according to FIG. 3 the slide pistons 9, 10, 11 are is moved by a depression device 27 against the resistance of a spring 28.

Figure 4:
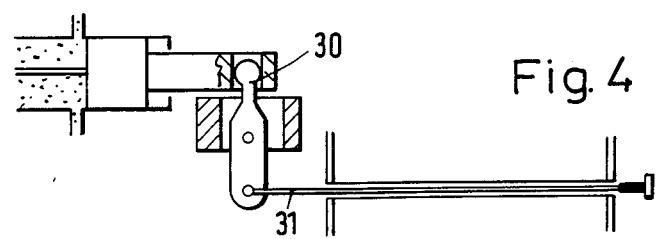

In the embodiment according to FIG. 4 the slide plug 8 is mechanically controlled by a lever 30 which is moved by a cable 31 or a linkage.

The closing of the inlet openings 19,20 of the hydraulic cylinder can be performed directly by a solenoid valve. Besides or instead of influencing the fuel conduit 22, 24, the security device can also control an injection pump and/or an electrical circuit of the vehicle.

The security device can be actuated by any suitable means, such as the described key switch, an electronic access device, an electronic remotecontrol device and the like.

I claim:

1. A security device for an automotive vehicle comprising, in combination with:
   a steering linkage of said vehicle, a hydraulic cylinder having a piston displaceable in said cylinder and provided with a piston rod connected to said linkage whereby said piston rod and said linkage are jointly displaceable for steering of said vehicle, said cylinder having ports on opposite sides of said piston, of:
      a steering lock which comprises means defining a pair of passages respectively communicating with said ports, and a member shiftable on said means between a position in which said passages are unblocked for normal steering operation and a position wherein said passages are blocked and said piston is thereby locked against displacement to lock said linkage, and an actuator operatively connected to said member for displacing said member between said positions.

2. The combination defined in claim 1 wherein said cylinder forms part of a power-assist system for actuating said linkage in steering the vehicle.

3. The combination defined in claim 1 wherein said member is a hydraulic slide plug.

4. The combination defined in claim 1 wherein said acutator is an electromagnet.

5. The combination defined in claim 1 wherein said acutator is an electric motor.

6. The combination defined in claim 1 wherein said member forms part of a solenoid valve and said actuator energizes said solenoid valve.

7. The combination defined in claim 1 wherein said actuator includes a click key switch.

8. The combination defined in claim 3 wherein said actuator includes a solenoid valve for actuating said slide plug.

9. The combination defined in claim 3, further comprising a pressure device connected with said slide plug for actuating same.

10. The combination defined in claim 3 wherein said actuator includes a mechanical device connected to said side plug.

11. The combination defined in claim 3 wherein said actuator includes a key-operated switch, an electric motor connected to said switch by an armory cable and controlled by said switch, a threaded spindle driven by said motor, and a nut on said slide plug threadedly, engaging said spindle, said slide plug being formed with means for blocking fuel supply to an engine of said vehicle and with means for interrupting an ignition circuit thereof.

* * * * *